W. B. S. WHALEY.
GATE VALVE.
APPLICATION FILED NOV. 23, 1917.
1,391,987.
Patented Sept. 27, 1921.
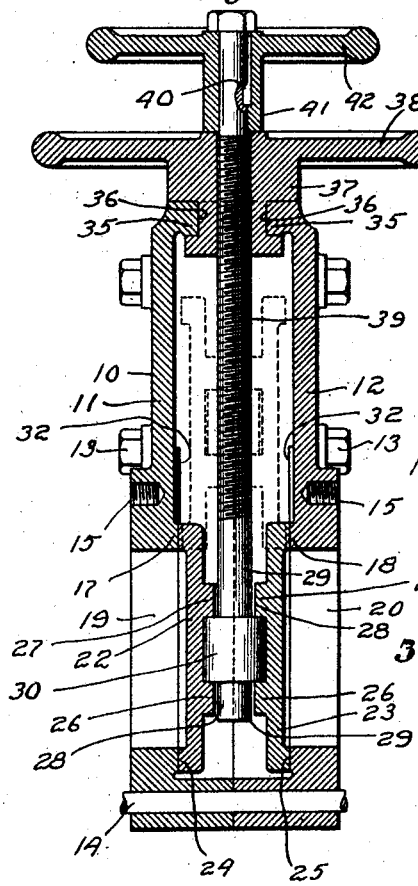
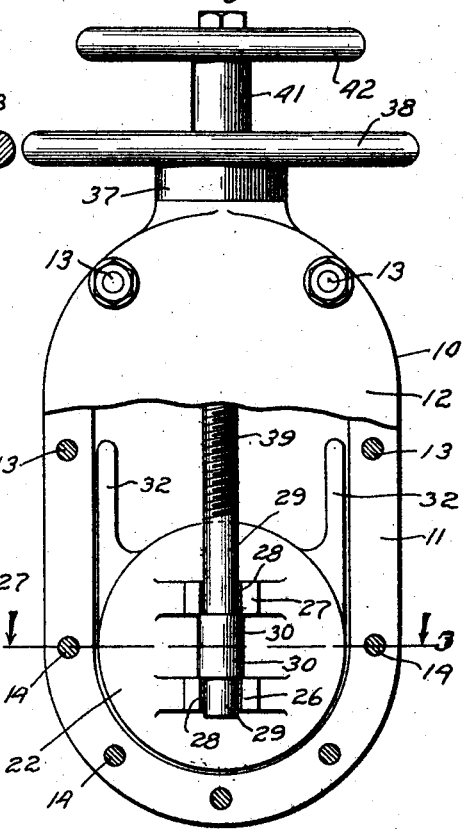
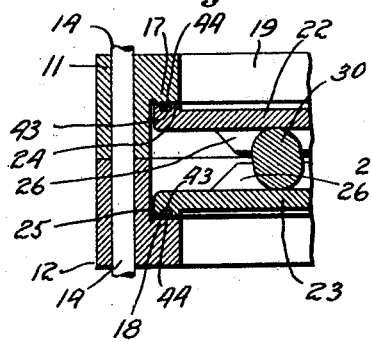
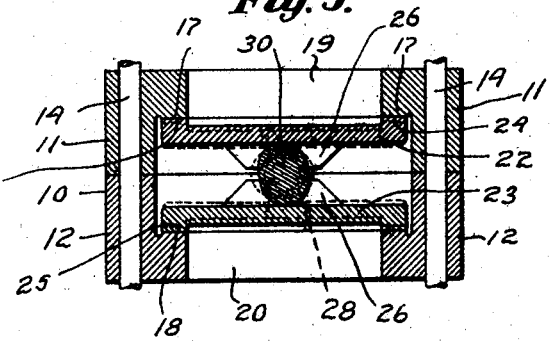
Inventor:
William B. Smith Whaley,
by David Lichtenstein
Atty.

UNITED STATES PATENT OFFICE.

WILLIAM B. SMITH WHALEY, OF MALDEN, MASSACHUSETTS, ASSIGNOR TO AMERICAN WHALEY ENGINE COMPANY, OF BOSTON, MASSACHUSETTS, A CORPORATION OF MASSACHUSETTS.

GATE-VALVE.

1,391,987.  Specification of Letters Patent.  Patented Sept. 27, 1921.

Application filed November 23, 1917. Serial No. 203,517.

*To all whom it ay may concern:*

Be it known that I, WILLIAM B. SMITH WHALEY, a citizen of the United States, and resident of Malden, in the county of Middlesex and State of Massachusetts, have invented a certain new and useful Improvement in a Gate-Valve, of which the following is a specification.

This invention relates to a gate valve and the like, adapted in its principles, application and construction to overcome difficulties, objections and obstacles encountered, especially under conditions of severe use in certain engineering fields. Its particular application and use is desirable under conditions where erosive, corrosive or adhesive action generally or usually takes place between the valve and its seat, or where hot gases or hot liquids are passed through the valve proper causing troublesome expansion of the valve and valve seat, thereby preventing relative separation without danger of damage to the parts. Also, by reason of the principles of operation and construction thereof, said valve may always be tightly closed against its seat by positive means, thereby preventing leakage which permits erosion if allowed to continue. Other advantages will also be pointed out in the description hereinafter.

In order to illustrate my invention I have shown in the accompanying drawing but a single embodiment thereof, wherein:—

Figure 1 is a central vertical section of a valve of my invention.

Fig. 2 is a partial central transverse section and elevation of said invention.

Fig. 3 is a horizontal section on line 3—3 on Fig. 2 looking in the direction of the arrows.

Fig. 4 is a sectional detail of the valve gate and its seat, with a packing element interposed therebetween.

The terms employed herein are used in the generic and descriptive sense to designate parts or elements, and are not therefore intended primarily as terms of limitation.

In the drawing, 10 represents in its entirety a body, casing or the like to provide a foundation for and to inclose the different elements. Said casing, especially in the large size valves, preferably consists of two housings 11 and 12 to facilitate construction and installation. The housings 11 and 12 are held together by bolts 13 and 14, the latter being of such length as to permit their being employed also to clamp the casing 10 to flanges or the like on pipes or conduits. At positions or points where through bolts cannot be employed without interfering with other parts, clamp screws 15 hold or secure the said flanges to the body or casing.

Therefore, the valve may be employed between a gas producer, gas generator of any type, or a furnace liberating usuable gases and gas storage vessels or an internal combustion engine. The valve may also be employed where liquids of a volatile or corrosive nature are conveyed by piping from one vessel to another. Hot hydrogenous gases generally cause valves to stick or adhere to their seats from one cause or another, but in the case of my invention such gases cannot damage the effectiveness of the valves and their seats.

In order to accomplish the above objects I provide the housings 11 and 12 with the oppositely disposed parallel valve seats 17 and 18, respectively. Preferably, these seats are flat and extend in a direction transverse to the inlet and outlet passages 19 and 20. Between the said valve seats 17 and 18 and arranged for vertical transverse movement and independent movement toward and from the same, are a pair of separate floating valve or valve gates 22 and 23.

Said valves are provided with valve faces 24 and 25, adapted to contact with or seat against the said valve seats 17 and 18. The sides of the valves opposite to the said valve faces have thereon a pair of separated lugs 26 and 27, each of which is recessed or bored out at 28 to permit of an enlarged passage for the valve stem 29. The recessed or bored portions 28 are of greater diameter than the diameter of the said valve stem 29 to permit the said valve to float or move toward and from said valve stem for the purposes hereinafter set forth.

Fitting between and engaging the shoulders formed by the lugs 26 and 27 is the enlarged eccentric or cam portion 30 of any preferred construction, having double cam faces adapted to engage the rear faces of the valves 22 and 23. Said cam is preferably integral with the valve stem 29 to perform the double functions of moving said valves in unison into and out of axial alinement with the valve seats 22 and 23 and when rotated to move or cam said valves each toward and from the other and said valve seats.

Guides 32 flush with and projecting from the valve seats 17 and 18 are adapted to guide the valves on and off their respective valve seats and prevent the valve from twisting into positions so that the edges thereof cannot strike against the edges of said seats.

At the tops of the housings 11 and 12 each is provided with an inwardly projecting flange 35 to form shoulders adapted to bear in the annular slot 36 encircling the hub 37 on the hand wheel 38. The said hub is threaded centrally thereof to engage with the threaded portion 39 on the valve stem 29. The said valve stem has a portion which always projects above the hand wheel 38 and keyed to said portion at 40 is the hub 41 of the hand wheel 42.

Referring to Fig. 4, each of the valves 22 and 23 is provided with an annular groove 43 within which is preferably a refractory strip of material 44, as asbestos or soft metal, adapted to engage with the valve seats to form a yielding packing. Likewise the said groove may be cut within the valve seat and then filled with the said packing to engage with the valves, thus reversing the specific struction illustrated, the object being to provide a packing preferably of a more or less refractory material.

The operation of the invention is as follows:

Referring to Fig. 1 wherein the valves 22 and 23 are in the closed position, the same may be opened by first partially rotating the hand wheel 42 in the left-hand direction, causing the cam 30 to be rotated in the same direction as indicated by the arrows in Fig. 3. The said cam 30 will then be in the dotted line position so as to permit the valves 22 and 23 to move one toward the other until the enlarged bored portions 28 engage with the valve stem 29 providing for relative clearance of the valves, or until the said valves are freed from the valve seats 17 and 18, as indicated in dotted lines in said Fig. 3. If the said valves, for any reason whatsoever, have been caused to adhere to their respective valve seats, they will be freed therefrom when the operator grasps the hand wheel 38 rotating it to cause the screw 39 and valve stem 29 to move upward or toward said handle. When the valve is fully opened or removed entirely from between the openings 19 and 20, the valves will be in the positions indicated in dotted lines in Fig. 1. Likewise, the valves may be opened or closed to any position intermediate the above positions.

To close the valve the reverse operations are carried out. That is, the hand wheel 38 is rotated to cause the valve stem 29 to be screwed downward, causing the cam 30 to carry therewith the valves 22 and 23 until they reach the lowest position indicated in full lines in Fig. 1. Thereafter, the hand wheel 42 is rotated to rotate said valve stem 29 and the cam 30 to cause the latter to engage the rear faces of said valves and cam or force them tightly to their respective valve seats, as indicated in Figs. 1 and 3.

Therefore, when the hand wheel 38 is rotated the valve stem 29 has imparted thereto axial movement only, and when the hand wheel 42 is rotated the said valve stem and cam are rotated about their axis to force the said valves tightly to their respective seats. This construction provides a tight and effective valve, especially adapted to close or stop the passage of high temperature hydrogenous gases passing from one vessel to another. Said gases are especially difficult to confine or check by valves, both on account of the nature of the gas and difficulties of handling the same, but in addition the erosive or corrosive actions thereof, when contacting with metals, causes valves to stick or freeze to their valve seats.

The direct and positive action of the cam 30 in applying the closing or tightening pressure of the valves upon their respective seats and in the direction of flow of the gases or fluids, is the effective feature of the invention. Also, in the event that the cam snugly holds the said valves to their seats without excess straining pressure being applied by said cam, the valve on the pressure side of the line or pipe would act against the cam to force it against the opposite valve to tightly force the latter to its seat. This effect will prevent leakage and erosion, as gases or fluids cannot pass both valves to cause a "flow" in the pipe line.

No care need be exercised to construct or maintain parallelism between the valves or the valve seats, or to exercise caution in the construction or operation of the cam. The valves will seat properly and tightly as the said cam will position itself between said valves. Therefore, expansion due to hot gases or the like will not cause troublesome distortion of the valve seats relative to each other or to the valves. The distortion will not prevent proper seating of the valves.

I have described herein one embodiment of my invention, but it is to be understood that the latter is not essentially limited to the specific construction and organization of said embodiment, since the same may be varied without departing from the proper scope of the claims.

Having thus described my invention in detail, what I claim as new is:—

1. In a valve, the combination of a parted casing comprising two similar members adapted to be joined together to form a unit casing member provided with an elongated chamber, having an end or neck opening and oppositely disposed openings in the sides of said casing members provided with parallel valve seats surrounding said openings; a similar and independent valve for each of said oppositely disposed openings provided with a pair of cam retaining lugs; a valve stem interposed between said valves and having a screw threaded portion projecting through the neck portion of said unit casing and a cam portion engaged by said cam retaining lugs; a hand wheel rotatably held in said neck and opening and against axial movement and engaging said screw threaded portion of said valve stem to move same axially therein; and an auxiliary hand wheel for said valve stem secured thereto to rotate therewith and adapted independently to rotate said stem and said cam thereof to cause the latter to wedge the said valves upon their respective valve seats or to release same therefrom.

2. In a valve, the combination of a divided casing comprising two similar members joined together to form a unit valve body provided with a valve chamber having oppositely disposed openings therethrough in the sides thereof, parallel valve seats within said chamber surrounding said openings and extending beyond the position of same, and a circular opening and flange surrounding same formed between said valve casing members at one end thereof; an independent valve for each valve seat provided with cam housing and retaining means; a screw threaded valve stem provided with a cam section adapted to engage with said cam housings of said valves for moving the same along said valve seats and for forcing them thereagainst; valve stem shifting means rotatably secured within said end opening and tapped to engage the threaded section of said valve stem; and means provided on the projecting end of said valve stem for turning the same into locked position.

WILLIAM B. SMITH WHALEY.

Witnesses:
 TAKANG KAO,
 ALFRED F. JACKSON.